United States Patent
Akasaka

[15] 3,636,847
[45] Jan. 25, 1972

[54] AUTOMATIC FILM SENSITIVITY SETTING DEVICE

[72] Inventor: Shigeo Akasaka, Tokyo, Japan
[73] Assignee: Nippon Kogaku K.K., Chuo-ku, Tokyo, Japan
[22] Filed: Nov. 17, 1970
[21] Appl. No.: 90,321

[30] Foreign Application Priority Data

Nov. 25, 1969 Japan..............................44/111462

[52] U.S. Cl. ............................95/31 FS, 95/10 C, 352/72
[51] Int. Cl. ...........................................................G03b 19/18
[58] Field of Search ...............95/10 C, 31 R, 31 CA, 31 FS; 352/72, 78, 78 C

[56] References Cited

UNITED STATES PATENTS

| | | |
|---|---|---|
| 3,266,398 | 8/1966 | Kremp et al. ........................95/31 FS |
| 3,410,186 | 11/1968 | Tatsuo Kaneko....................352/72 X |
| 3,461,782 | 8/1969 | Yoshihisa Katsuyama..........352/72 X |
| 3,495,901 | 2/1970 | Neudecker et al....................352/72 |

FOREIGN PATENTS OR APPLICATIONS

| | | |
|---|---|---|
| 1,802,896 | 6/1969 | Germany..............................95/31 FS |
| 1,930,888 | 1/1970 | Germany..............................95/31 FS |

*Primary Examiner*—Joseph F. Peters, Jr.
*Attorney*—Ward, McElhannon, Brooks & Fitzpatrick

[57] ABSTRACT

An automatic film sensitivity setting device for a camera using a film container having at its periphery signal means representing the sensitivity of a self-contained film, and providing a sensing member for an exposure meter within the camera connectable to said signal means. When the film container is mounted on the camera, the film sensitivity of the film container is introduced into the exposure meter.

7 Claims, 4 Drawing Figures

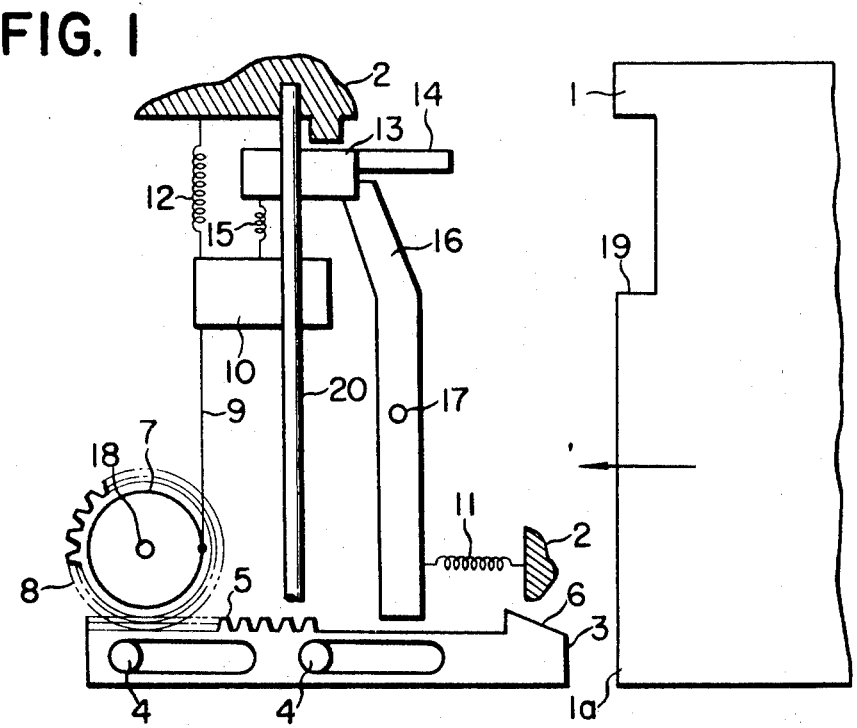
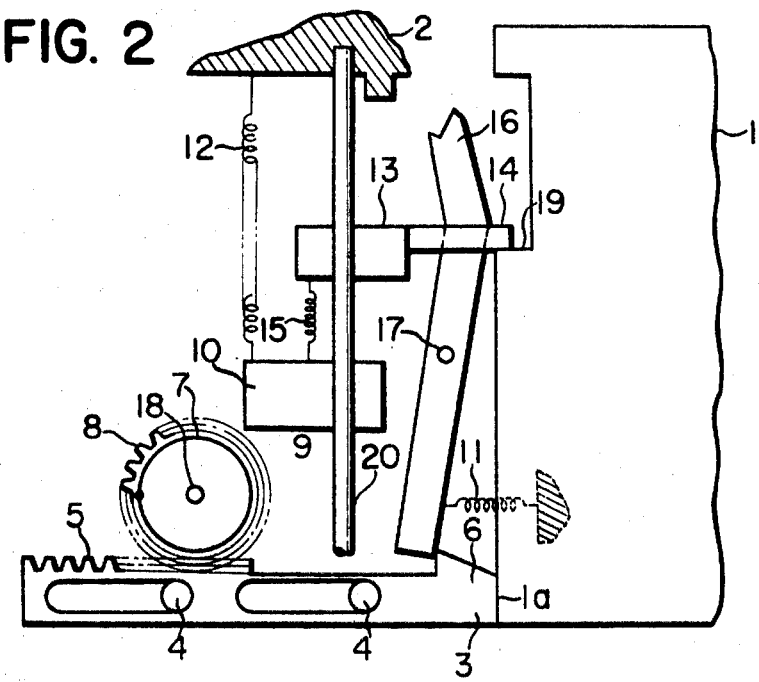

3,636,847

AUTOMATIC FILM SENSITIVITY SETTING DEVICE

BACKGROUND OF THE INVENTION

1. Field of the Invention

This invention relates to an automatic film sensitivity setting device for a camera using a film container having code means such as recess or protrusion representing the sensitivity of a self-contained film, and more particularly to an improved automatic film sensitivity setting device for such camera which is operatively associated with the exposure meter of the camera to automatically set the sensitivity of the film.

2. Description of the Prior Art

Most of the known setting devices of the described type provide connecting means at the back or cover plate of a camera to connect the signal means of the film container and the sensing means of the camera body, and this connection is completed when the cover plate is closed or locked. The film sensitivity setting is therefore effected when the camera is in closed position. However, the cover plate of the camera is generally arranged to provide lighttight integrity when closed, so that it has been difficult to verify externally whether or not the connection between the signal means and sensing member has been duly set or not.

SUMMARY OF THE INVENTION

The first object of the present invention is to overcome the aforementioned difficulty encountered by the prior art devices and enable the film sensitivity setting to be achieved automatically independently of the action of the cover plate of a camera so that such setting can be verified, and the invention provides connecting means to indicate the completion of the connection by producing an impact sound between code or signal means and the sensing member when they are connected.

Moreover, in the type of a camera using an interchangeable film container, when the film container is mounted on the camera, it is desirous to secure the film container at a predetermined position, but usually there is only limited space between the film container and the portion at the camera body upon which to mount the film container. Consequently, there is a problem in the selection of an arrangement for connecting the signal means and the sensing member or in the requirement a complicated structure for mounting the film container while verifying the connecting state of both members.

Therefore, the second object of this invention is to separate means for connecting the signal means and the sensing member into means to obtain the necessary energy for the contact of two members and means for initiating the connection of both members and to locate two separated means at appropriate positions, respectively, for achieving their objects.

According to the present invention, such objects may be achieved by an improved automatic film sensitivity setting device, in which a film container has at its periphery signal or code means representing the sensitivity of a self-contained film, and an energy charging means is provided at the camera body for charging energy to the sensing member when the film container is mounted to the camera by utilizing its moving operation, and by using thus charged energy, the sensing member of the camera body is impactly engaged with the signal member of the container so that the film sensitivity of the film container is introduced into the exposure meter.

The invention will be described in greater detail with respect to some specific embodiments thereof as shown in the accompanying drawings.

BRIEF DESCRIPTION OF THE DRAWINGS

FIG. 1 is a schematic front view of the automatic film sensitivity setting device according to an embodiment of the present invention, showing the device in a position prior to loading of a film container;

FIG. 2 is a view similar to FIG. 1 but showing the device in a position where loading of the film container has been completed.

DESCRIPTION OF THE PREFERRED EMBODIMENTS

Figure 3:
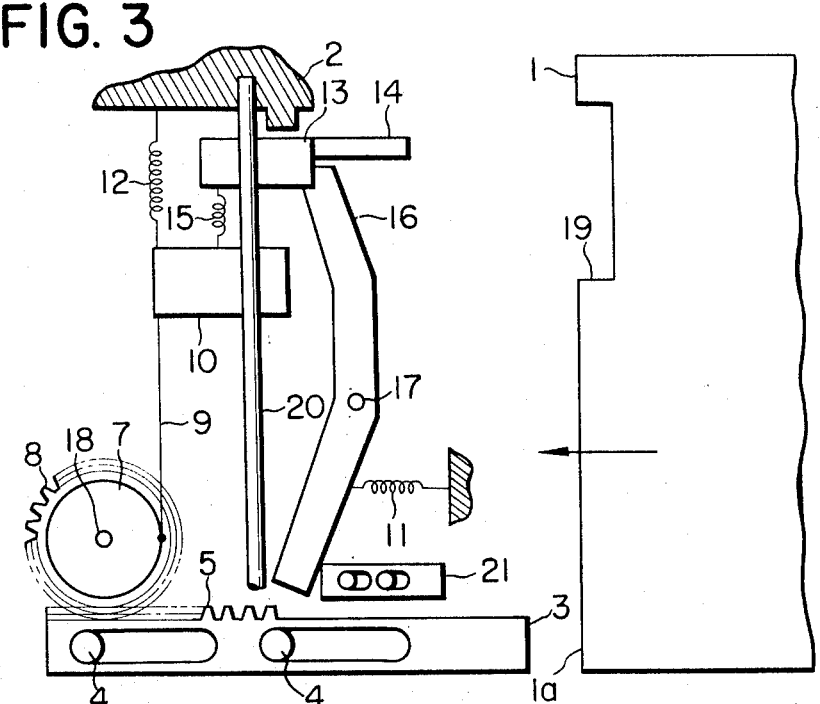
FIGS. 3 and 4 are schematic front views showing modifications of the device of FIGS. 1 and 2.

Referring to FIG. 1 of the drawings, there is shown an embodiment of the present invention together with a film container 1 such as film magazine, film cartridge or the like. The film container 1 has a recess 19 which provides code means representing the sensitivity of a self-contained film. A camera body, partly indicated at 2, includes a slotted movable member 3 which is slidable along guide pins 4 studded in the camera body. The movable member 3 has a rack 5 formed at one end portion thereof and a key portion 6 formed at the other end. A spool 7 formed integrally with a pinion 8 is rotatably mounted on a rotary shaft 18, the pinion 8 being in mesh with the rack 5 of the movable member 3.

The spool 7, pinion 8 and shaft 18 together with a length of thread 9 to be described constitutes an interlocking mechanism.

A slide member 10 is disposed for sliding movement along a guide shaft 20 fixed to the camera body 2. The thread 9 has one end thereof secured to the outer circumference of the spool 7 and the other end secured to the slide member 10. A first spring 12 is extended between the camera body 2 and the slide member 10 for urging the slide member 10 into its normal position (FIG. 1) when the camera is not loaded with the film container 1. As the movable member 3 is moved leftwardly as viewed in FIG. 1, the slide member 10 is moved downwardly by means of the interlocking mechanism against the force of the first spring 12. Film sensitivity detecting means 13 including a film sensitivity detecting member 14 is disposed so as to slide on the guide shaft 20, and the means 13 is operatively associated with conventional exposure regulating means (not shown) provided in the camera body. A second spring 15 is provided between the film sensitivity detecting means 13 and the slide member 10. When no film container is present within the camera, the film sensitivity detecting means 13 is retained in its normal position (FIG. 1) by retaining means to be described.

The downward movement of the slide member 10 causes the second spring 15 to expand and, when the film sensitivity detecting means 13 is released from the retaining means as will be described later, the expanded spring 15 in turn causes the film sensitivity detecting means 13 to move downwardly, whereby the film sensitivity detecting member 14 thereof is allowed to engage the signal means 19 of the film container 1.

A retaining lever 16 is pivotally mounted on the camera body by means of a pin 17 and normally is urged counterclockwise by a spring 11 so that the upper end of the lever 16 engages and retains the film sensitivity detecting means 13 in its normal position while the lower end of the lever 16 is in the path of the key portion 6 of the movable member 3. At the final stage of the film container loading operation, the retaining lever 16 is adapted to release its engagement with the film sensitivity detector means 13.

The retaining lever 16, pin 17 and spring 11 together constitute the aforementioned retaining means for retaining the film sensitivity detecting means 13 in its normal position.

In operation, the film container 1 such as a film magazine, film cartridge or the like is first introduced into the camera as indicated by the arrow in FIG. 1, whereupon the movable member 3 is forced to move leftwardly along the guide pins 4 by the lower side edge 1a of the film container 1. This in turn causes the spool 7 to rotate clockwise because the pinion 8 on the spool engages with the rack 5 of the movable member 3. Thereupon, the thread 9 having one end thereof secured to the spool 7 is wound on the spool 7, and since the other end of the thread 9 is secured to the slide member 10, the slide member in turn moves downwardly along the guide shaft 20 fixed to the camera body 2. On the other hand, since the film sensitivity detecting means 13 is engaged with the upper end of the lever 16, the film sensitivity detecting means 13 is still retained in its normal position. This causes expansion of the first spring 12 and the second spring 15.

As the film loading further proceeds to its final stage where the film sensitivity detecting member 14 of the means 13 is allowed to engage the recess 19 forming the code means of the film container 1, the key portion 6 of the movable member 3 causes the retaining lever 16 to rotate clockwise against the force of the spring 11, thereby releasing the retaining engagement of the retaining lever 16 with the film sensitivity detecting means 13. As a result, the film sensitivity detecting means 13 is allowed to move down with the aid of the force of the second spring 15 until the film sensitivity detecting member 14 engages the recess 19 now at the lower edge thereof. When the film loading is thus completed, the entire device is in a position as shown in FIG. 2. Since the film sensitivity detecting means 13 is operatively associated with the exposure regulating means in the camera body as mentioned previously, the film sensitivity may be automatically set.

In unloading, when the film container 1 is moved rightwardly from the loaded position, the movable member 3 is also moved rightwardly by the force of the expanded first spring 12 via the interlocking mechanism engaging the rack 5 of the member 3. This causes the slide member 10 and accordingly the film sensitivity detecting means 13 to be moved upwardly to return to its normal position.

The rightward movement of the movable member 3 also causes the key portion 6 thereof to be disengaged with the lower end of the retaining lever 16, whereby the retaining lever 16 is allowed to rotate counterclockwise by the force of the spring 11 until the upper end of the lever 16 engages and retains the film sensitivity detecting means 13 in its normal position of FIG. 1.

Turning now to FIG. 3, there is shown a modified form of the present invention, in which an additional movable member 21 formed with slots receiving guide pins therein is provided to release the engagement between the retaining lever 16 and the film sensitivity detecting means 13. The additional movable member 21 is designed to move by means of the film container when same is mounted on the camera body. The member 21 obviates the need for the key 6 on member 3.

Figure 4:
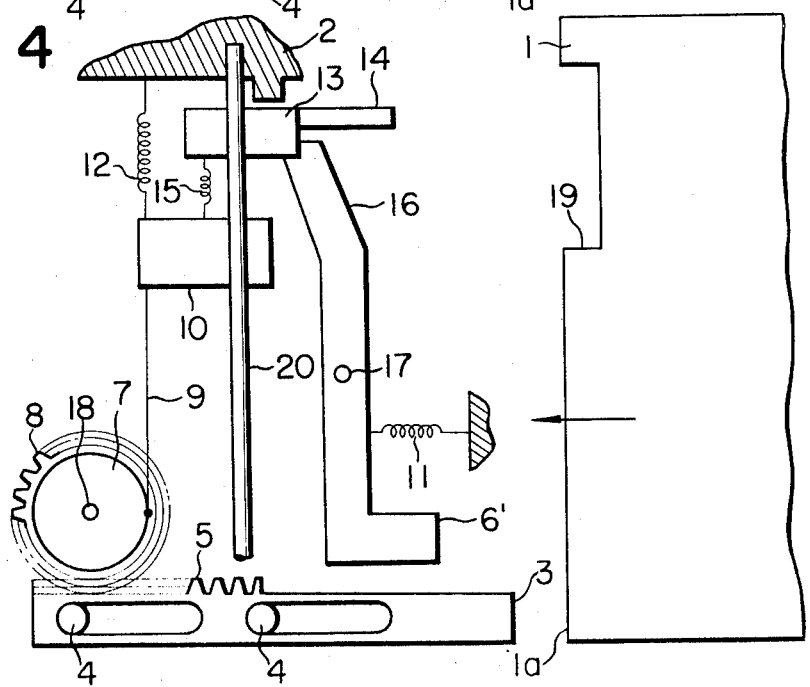

Turning to FIG. 4, there is shown another modification of the present invention, in which the retaining lever 16 has an integral pawl member 6' formed at the lower end thereof which is directly forced by movement of the film container 1, in the direction of the arrow, to disengage the retaining lever 16 from the film sensitivity detecting means 13.

It will thus be appreciated that upon loading of a film container into the camera the film sensitivity detecting member of the camera body engages the signal means of the film container to thereby set the film sensitivity with the back or side cover plate of the camera remaining open, so that verification can be readily attained from outside as to whether the film sensitivity has been set or not. Also, a click sound produced upon engagement of the film sensitivity detecting member with the signal means of the film container provides assurance that the film sensitivity setting has been duly accomplished. Thus, the present invention provides an automatic film sensitivity setting device for a compact cine camera which enables the accomplished film sensitivity setting to be readily known from outside the camera.

It is to be understood that the present invention may also be applicable to cameras having no cover plate.

While the invention has been shown and described with respect to some specific embodiments, it should be noted that various changes and modifications may be made therein without departing the spirit of the invention as defined in the appended claims.

What is claimed is:

1. An automatic film sensitivity setting device for a camera using an interchangeable film magazine and introducing the film sensitivity of the film in said film magazine into an exposure measuring device in interlocking relation with the loading operation of the magazine to the camera body, which device comprises;

1. signal means formed at the periphery of the film magazine and representing the sensitivity of the film therein;
2. a sensing member movably mounted relatively to the camera body for contacting said signal means when the film magazine is loaded on the camera body, said sensing member being connected to the exposure measuring device so as to introduce the film sensitivity into the exposure measuring device upon contacting with said signal means;
3. means for moving said sensing member including a shiftable member engageable with the wall of the film magazine, said moving means being moved from its initial position to its second position by the film magazine when the film magazine is loaded;
4. a first resilient member provided between said moving means and the camera body for returning said moving means to said initial position when the film magazine is unloaded, said first resilient member accumulating a returning force in accordance with the movement of said moving means which is moved from said initial position to said second position;
5. a second resilient member provided between the sensing member and said moving means for driving the sensing member to said signal means, said second resilient member accumulating a driving force in accordance with the movement of said moving means which is moved from said initial position to said second position; and
6. a locking member biased toward the sensing member for locking the sensing member at a starting position in which the sensing member is disengaged from said signal means and unlocking the sensing member by means of the movement of the film magazine when said signal means reaches within the path of the movement of the sensing member; whereby, when said moving means is moved from said initial position to said second position, said signal means reaches within the path of the movement of the sensing member and said locking member releases the locking of the sensing member and then the sensing member is moved from said starting position to said signal means by means of said driving force of said second resilient member so as to come into collision with said signal means, thereafter, the sensing member is returned to said starting position by means of the movement of said moving means which is moved from said second position to said initial position.

2. A device according to claim 1, further comprising an elastic member provided at the camera body having energy to return the locking member to its locking position as the film magazine is removed from the camera body, and after the removal of the film magazine, to retain the locking member at its locked position.

3. A device according to claim 1, further comprising a connecting member provided reciprocatingly at the camera body and contactably to the locking member and the film magazine so as to transmit the loading operation of the film magazine to the locking member.

4. A device according to claim 1, wherein said shiftable means comprises a hook portion which moves the locking member to a position to release it from the locking of the sensing member when said signal means is located within the path of the movement of the sensing member and which retains the locking member at said position while the film magazine is loaded on the camera body.

5. A device according to claim 1, wherein said signal means is formed in the shape crossing the path of the movement of the sensing means on the film magazine wall which faces in the loading direction of the film magazine;

said shiftable member has a rack and is mounted for reciprocating movement; and said moving means further comprises a movable member engageable with the sensing member for returning the sensing member to said starting position, moved reciprocatingly in the moving direction of the sensing member and connected with one end of the first resilient member and with one end of the second resilient member, transmitting means for transmitting the movement of said shiftable member to said movable member, including a pinion in mesh with said rack, a wheel connected to said pinion and flexible means wound around said wheel and connected to said movable member.

6. An automatic film sensitivity setting device of the class described, comprising: sensing means mounted for movement relatively to a camera body for engaging signal means on a film magazine when the same is loaded into the camera body, said signal means indicating the sensitivity of film in the magazine and the sensing means being connected to an exposure measuring device so as to introduce the film sensitivity into said exposure measuring device upon loading of the magazine, a member slideably mounted on said camera body for movement by the magazine when the same is loaded, means accumulating energy upon shifting of said slidable member by loading the magazine, and retaining means normally retaining said sensing means in a first position and being operable by the magazine being loaded to release said sensing means, said sensing means including a detector engaging said signal means when the magazine is loaded to detect the sensitivity of the film in the magazine.

7. An automatic film sensitivity setting device according to claim 6, wherein means are provided to return said sensing means and said slidable member to their original positions, and said retaining means to a position to retain said sensing means in original position, when the film magazine is unloaded from the camera body.

* * * * *